Patented Oct. 21, 1952

2,615,053

UNITED STATES PATENT OFFICE 2,615,053

PROCESS FOR REFINING CRUDE INOSITOL-CONTAINING SOLUTIONS AND FOR RECOVERING INOSITOL THEREFROM

Neal E. Artz and William Hach, Oak Park, Ill., assignors to Corn Products Refining Company, New York, N. Y., a corporation of New Jersey No Drawing. Application October 1, 1949, Serial No. 119,198

10 Claims. (Cl. 260—631)

This invention relates to an improved method of refining crude inositol-containing solutions, particularly such solutions as those obtained by hydrolysis of salts of phytic acid, and for recovering high yields of good quality inositol therefrom.

Inositol has been known for many years to occur in most plants, chiefly in combined form as an ester of phosphoric acid probably for the most part as inositol hexaphosphate, commonly referred to as phytic acid. Phytic acid is found in plants as acid salts, some of its twelve acid hydrogen atoms being replaced by other cations, particularly magnesium and potassium. Convenient sources of inositol are the phytates or crude material containing phytates obtained by extracting materials of plant origin with dilute acid and precipitating the phytates with a base. The most convenient source of these phytates or phytate-containing materials is corn steep liquor, a by-product in the wet milling of corn.

In order to obtain inositol from phytates or phytate-containing material, phosphoric acid must be removed by hydrolyzing the inositol phosphate ester linkage. A variety of means have been utilized for accomplishing this hydrolysis, including heating at various temperatures for varying lengths of time in the presence of acidic or basic catalysts or without any catalyst. One of the most convenient methods for commercial operation is to heat an aqueous slurry of phytates such as commercial calcium phytate at about 130 P. S. I. steam pressure for a period of one to three hours. The product of such conversion is a slurry having a pH level of about 3 to about 4 containing a solid phase consisting chiefly of calcium acid phosphate, which may be removed by centrifugation, filtration, etc. The clarified liquor, which contains the inositol liberated during hydrolysis, usually is of a somewhat brown color, depending on the quality of the starting material. Because of its acidity, it also has a high ash content, chiefly calcium, if calcium phytate was used, and phosphate ions.

To obtain inositol from phytate hydrolyzates advantage is usually taken of the known low solubility of calcium phosphate, and the hydrolyzate is neutralized with calcium oxide or hydroxide, usually an excess, and the calcium phosphate removed. Any excess calcium ions can be removed by addition of small amounts of acids such as phosphoric or oxalic acid or by treating with acid forming substances such as carbon dioxide which form insoluble compounds with calcium. These treatments result in a refined hydrolyzate of reduced ash content, from which inositol usually will crystallize after sufficient concentration. The expedient of adding an alcohol or glacial acetic acid has been used to increase the yield of inositol. Carbon treatment has proved to be of advantage in removing some of the color from the solution prior to concentration, but has no perceptible effect on the amount of inositol recovered.

We have found that maximum ash removal is accomplished when crude inositol solutions, i. e. inositol solutions obtained by the hydrolysis of phytic acid, its salts, or crude materials containing the same, are neutralized with calcium oxide or hydroxide to a pH value of about 9 to about 10. If treatment with lime is carried further, e. g., to pH 11 to 12, ash removal is not adversely affected, but when the precipitate has been removed from the neutralized liquor, the clarified liquor recovered will be found to contain less inositol than clarified liquor recovered from samples of the same liquor neutralized to lower pH levels.

We have further found that neutralization of crude inositol-containing solutions with calcium oxide or hydroxide to a permanent pH value within this optimum range of about 9 to about 10 is an extremely difficult and time consuming operation, and thus is not likely to be carried out satisfactorily in plant operation.

A description of the manner in which crude inositol solutions obtained by hydrolysis of phytates behave during neutralization with lime will illustrate the difficulty encountered.

Inositol liquor obtained by the hydrolysis of the phytates, as aforementioned, usually has a pH value of about 3 to about 4. When lime slurry is added slowly and with constant agitation to such a liquor, the pH level rises rather rapidly until it reaches 5.0 to 5.5, after which addition of a considerable amount of the lime slurry causes only a slight, temporary increase. Thus, if a liquor that has been neutralized to pH 5.5 is treated with sufficient additional lime to increase the pH to 6.0 and stirring is continued without further lime addition, the pH level usually will drop back to about 5.5; this operation can be repeated a number of times and finally a point will be reached where the pH-drift on standing will be up, rather than down, becoming constant at pH 6.4, for example. This type of behavior will be noted as lime is added to partially neutralized phytate hydrolyzates in the pH-range of about 5.5 to about 8.5. Throughout this range the operator must wait after each addition of lime, at least until the direction of the pH-drift is apparent; if this is downward, it usually is safe to add more lime. If upward, he must wait until the pH value has remained constant for at least fifteen minutes, since the extent of the drift cannot be predicted. Extreme care is required as the desired pH range of about 9 to about 10 is approached. Sometimes addition of a relatively large amount of lime to a liquor whose pH is about 8 will cause only a slight, temporary increase in pH level, whereas in other cases, addition of a small amount of lime may initiate a rise that will continue to pH 12 or 13. In the latter case, if an attempt is made, without filtering, to decrease the pH level to the desired range of about 9 to about 10 by addition of phosphoric acid, the amount of phosphoric acid required usually will be found to be far out of proportion to the small amount of lime that initiated the final pH-rise. If lime is added to phytate hydrolyzates at a constant rate until a pH-level of about 9 to about 10 is reached and the sample then is allowed to stand, one of two results usually occurs: either the pH value will be found to have dropped, perhaps to 7 or lower, or it will have risen, perhaps to 12 to 13. Very seldom will the level remain at the point where addition of lime was stopped. If a batch in which the pH level fell below about 9 is filtered, the filtrate will contain essentially all of the inositol present in the original hydrolyzate liquor, but the ash content of the filtrate will be high. These inorganic impurities inhibit crystallization of inositol so that maximum yields will not be attained. Furthermore, the inositol which does crystallize from such solutions is of poor quality because of its high ash content. If a batch which attained a final pH level of 12 to 13 is filtered, the filtrate will be low in ash content, but usually will contain considerably less inositol than was present in the original liquor. Obviously, attempts to continuously neutralize phytate hydrolyzates with lime to a pH of approximately 9 to 10 are not likely to result in neutralized filtrates of uniform or optimum quality. Either over or under-neutralization is bound to affect the final yield of crystalline inositol adversely.

While these methods are successful in producing inositol from phytate hydrolyzates, considerable losses of the desired compound usually occur during the various processing steps, particularly to the phosphate precipitate obtained by neutralization of the hydrolyzate with lime, and to the mother liquors, from which crystallization is never complete.

Accordingly, it is an object of this invention to provide an improved process for refining crude solutions containing inositol.

It is also an object of this invention to provide a process for obtaining improved yields of inositol from solutions containing it.

It is a further object to provide a process whereby crystalline inositol of improved quality may be obtained in good yield from inositol-containing solutions. Other objects and advantages will appear hereinafter.

We have discovered that an insoluble lime-inositol complex is formed when lime is added to an aqueous solution of inositol. The amount of inositol insolubilized increases as the amount of lime is increased, the maximum amount of insoluble lime-inositol complex resulting when the amount of lime added amounts to at least about one mole per mole of inositol present. We have further discovered that when solutions of inositol, such as are obtained by the hydrolysis of phytates, are neutralized with lime to remove phosphate ion, addition of too much lime will result in the formation of the insoluble lime-inositol complex, which then will be removed with the precipitated impurities. This precipitate is usually referred to as the "phosphate cake," since the main constituent is calcium phosphate formed by the reaction of lime with the phosphoric acid liberated from the phytate by the hydrolysis, although other substances are also present depending upon the purity of the starting material and the hydrolysis catalyst used, if any. Inositol thus insolubilized as lime-inositol complex may be recovered, at least in part, by washing the phosphate cake exhaustively with water or preferably with dilute acid. However, such treatment also solubilizes ash, thereby defeating to a certain extent the purpose of the lime treatment. It also increases substantially the amount of water that must be evaporated to recover inositol from the clarified liquor.

The term "lime-inositol complex," as used herein, and in the appended claims is intended to refer to the insoluble inositol-containing substance obtained by the addition of lime or calcium hydroxide to an aqueous inositol solution of neutral or alkaline pH. The exact nature of this complex is unknown, but it appears to be a somewhat loose molecular association between inositol and calcium hydroxide or lime, probably in the ratio of one mole of inositol to one mole of lime or calcium hydroxide. The product is an amorphous white substance, slightly soluble in water, and strongly alkaline in reaction.

If the amount of lime added during the neutralization of the crude inositol solution is too small to permanently increase the pH to approximately 9 to 10, inositol will not be insolubilized as lime-inositol complex, but neither is maximum ash removal accomplished; therefore, maximum yields are not obtained in the subsequent crystallization step, and the inositol which does crystallize is of high ash content. On the other hand, if too much lime is added in attempting to neutralize the liquor with lime in one step to the desired pH of about 9 to 10, lime-inositol complex will be formed, resulting in a substantial loss of inositol to the phosphate cake.

We have made the surprising discovery that these difficulties can be avoided and inositol liquors obtained by the hydrolysis of phytates can be neutralized with lime precisely and consistently to within the desired pH range of about 9 to 10 by performing the lime treatment in two stages with an intervening separation of the precipitate formed in the first stage. Clarified liquors treated with lime in accordance with our new method contain a maximum amount of inositol and a minimum amount of ash. A further surprising advantage of our improved process is that less lime is required and a smaller amount of waste phosphate precipitate is produced than when proceeding according to the usual single-stage lime treatment described above, thereby reducing chemical cost and the amount and cost of material discarded.

According to our improved process, an aqueous lime slurry is added to the phytate hydrolyzate slowly and continuously with constant and efficient agitation until the pH level has risen to within the range of pH about 6 to about 7. The precipitate is then removed by filtration or other suitable means and the cake is washed; phytate hydrolyzates neutralized within this range show little tendency toward pH-drift when allowed to stand without filtering. The exact pH at which this filtration is accomplished is not critical provided it is within the specified range of about 6 to about 7. Although the phytate hydrolyzate may be filtered before neutralization is started, this is of no particular advantage. The size of the cake that can be removed by filtration before the start of neutralization is about the same as that of the additional cake formed during lime treatment of the clarified solution and the pH behavior during lime treatment is essentially the same whether or not the liquor is filtered before neutralization is started. The number of operations is decreased if lime slurry is added directly to the unfiltered liquor. Dry calcium oxide or lime, calcium hydroxide or aqueous slurries of these substances may be used, but the aqueous lime slurry is preferred.

To the combined filtrate and washings obtained from the first neutralization and filtration operation (to pH 6 to 7) additional lime slurry is added slowly and continuously to a final pH level of about 9 to about 10. During this operation, the pH level rises steadily with addition of lime and stops abruptly when lime addition is stopped; this is in marked contrast to the behavior of liquors that are neutralized with lime beyond approximately pH 7 without removing the precipitate already formed. When the desired pH level of about 9 to about 10 has been reached, the mixture is clarified by filtration, centrifugation, etc. The cake obtained in the final neutralization is very small in comparison with that produced during the initial lime treatment, and the combined cake obtained in the two operations is considerably smaller than that resulting when the same converter liquor is neutralized with lime to a similar final pH of approximately 9 to 10 in one step.

The small cake produced during the final lime treatment is washed, washings being added to the filtrate. The final resulting clarified solution will be found to contain essentially all of the inositol that was present in the original phytate hydrolyzate and also will contain a minimum amount of ash; when evaporated to suitable concentration such liquors produce high yields of crystalline inositol of good quality. The two-step lime treatment may be carried out at any convenient temperature without materially altering the efficiency of the process. In addition to enabling the neutralization of inositol-containing liquor to be carried out precisely to produce neutralized filtrates of maximum inositol and minimum ash content from which high yields of crystalline inositol can be obtained, our new method of carrying out the treatment with lime in two stages possesses further advantages, as previously pointed out; i. e. less lime is required and a smaller bulk of waste phosphate cake is produced. A relatively large amount of lime is required to increase the pH level of partially neutralized, unfiltered inositol liquor from approximately 7 to approximately 9, whereas if the same liquor is filtered after having been neutralized to about pH 7, a very small amount of lime is sufficient to bring the pH of the filtrate to the desired final level. We have found that the total lime requirement is decreased by ten to twenty per cent if lime treatment is carried out in two stages, rather than in a single operation. The total waste phosphate cake produced is correspondingly smaller.

As already stated, inositol-containing liquors that have been treated with lime and clarified by our improved process will produce good crops of crystalline inositol after they have been suitably concentrated and cooled. However, a considerable amount of inositol remains in the mother liquor. Although an additional crop of crystalline inositol may be obtained by concentrating the mother liquor from the first crystallization to a lower volume, the impurities remaining therein become concentrated also, and, consequently, second crops of inositol are usually of poor quality. The yield and quality of second crops of crystals have been improved by diluting the mother liquor with glacial acetic acid, but recovery of this acetic acid involves inconvenience and expensive procedures.

In addition to improving the yield and quality of inositol obtainable from phytate hydrolysates containing the same by a more precise method of treating with lime to the desired final pH range, we have discovered an improved method to further increase the total yield of inositol obtainable from its impure solutions by recovering about 80 per cent of the inositol remaining in the mother liquor of the first crystallization as inositol of satisfactory quality, on the basis of our discovery that inositol forms an insoluble complex with lime. We have found that at least about 80 per cent of the inositol remaining in the mother liquor from a previous crystallization is precipitated as lime-inositol complex by addition to the mother liquor of at least one mole of lime for each mole of inositol present therein. The precipitated insoluble lime-inositol complex can be readily separated from the liquor, while most of the impurities remain in solution.

The lime-inositol complex is strongly alkaline in reaction, and its inositol content is released and solubilized by treatment with acid. Thus, if the insoluble lime-inositol complex is added to phosphoric acid, inositol is solubilized and calcium phosphate precipitates. Similarly, if the lime-inositol complex obtained by treating mother liquors from inositol crystallization with lime is used to replace lime in the treatment of a succeeding batch of crude acidic inositol-containing liquor, inositol is freed from the complex and enriches the new batch of inositol liquor, the lime present in the complex neutralizing the phosphoric acid present and forming insoluble calcium phosphate.

We have found that when crude inositol liquors have been treated with lime to a pH of approximately 9 to 10 in two stages, as described above, using insoluble lime-inositol complex recovered from a previous batch of inositol mother liquor to replace at least part of the lime, the final clarified liquor contains not only all of the inositol that was present in the original liquor, but also that which was added as lime-inositol complex during neutralization. As a result of this enrichment, correspondingly larger first crops of crystalline inositol are obtained upon concentration and cooling of such liquors. Inositol remaining in the mother liquor can again be recovered as lime-inositol complex and recycled as described above.

This simple and economical method of recovering inositol from mother liquors of inositol crystallization, together with our new method of treating crude inositol-containing liquors with lime in two stages, represents distinct improvement in yield, quality and uniformity of inositol over previously used methods of recovering inositol from liquors containing it, such as those obtained by hydrolysis of salts of phytic acid or crude materials containing such salts.

The following examples serve to illustrate the behavior of inositol solutions and of phytate hydrolyzates, of which we have taken advantage in developing our process for refining inositol liquors and recovering improved yields of crystalline inositol therefrom.

Example I

A solution prepared by dissolving 200 g. of inositol in 1600 ml. of water was divided into four parts. Twenty-five g. of dry lime was added slowly and with constant agitation to samples No. 1 and No. 2. Samples No. 3 and No. 4 were treated similarly with 20 g. of magnesium hydroxide. Samples No. 1 and No. 3 were heated in a boiling water bath for six hours and samples No. 2 and No. 4 were allowed to stand at room temperature for a similar period. All samples were stirred occasionally. The lime-treated samples developed a bulky white precipitate, but those to which the equivalent amount of magnesium hydroxide had been added appeared to contain solids equivalent in bulk to the magnesium hydroxide added. All samples were filtered and washed and the dried cakes were weighed. Results were as follows:

| Sample No. | Base added | Inositol (g.) | Treatment | Wt. of cake (g.) |
|---|---|---|---|---|
| 1 | 25 g. $Ca(OH)_2$ | 50 | Heated | 41.42 |
| 2 | 25 g. $Ca(OH)_2$ | 50 | Room temp. | 49.32 |
| 3 | 20 g. $Mg(OH)_2$ | 50 | Heated | 19.20 |
| 4 | 20 g. $Mg(OH)_2$ | 50 | Room temp. | 19.33 |

This example illustrates the formation of insoluble lime-inositol complex as the result of adding lime to solutions containing inositol. The results also show that magnesium hydroxide does not form an insoluble complex with inositol under similar circumstances. However, we have found that filtrates obtained after treating acidic inositol-containing liquors with magnesium hydroxide, although containing all the inositol that was present in the original liquor, are of much higher ash content and therefore produce poorer crystalline yields of inositol than filtrates obtained from lime-treated samples of the same liquor.

Example II

Four 300 g. samples of phytate hydrolyzate, obtained by hydrolyzing a slurry of crude calcium phytate at 130 p. s. i. for about one hour, were treated as follows:

Small additions of dry lime were made to sample No. 1 until the pH level of the sample had risen from 3.5 to 6.6, constant agitation being maintained and sufficient time being allowed between additions for the pH level to become constant; a total of 10 g. of lime was thus added. After standing over night, the pH had not changed and the sample was filtered. The filtrate was brought to pH 8.7 by addition of 0.4 g. of lime. Sample No. 2 was treated with 10 g. of dry lime in one portion and agitated continuously. After two hours, the pH had risen to 6.8 and did not change thereafter. The sample was filtered and the filtrate was treated with 0.4 g. of dry lime which caused the pH level to rise to 8.7.

Sample No. 3 was treated, with constant agitation, with an aqueous slurry containing 10 g. of lime. After standing over night, the pH of the mixture was 6.6 and the mixture was filtered. An aqueous slurry containing 0.4 g. of lime was added to the filtrate, causing an almost immediate increase in pH level to 8.7, and this did not change when the sample stood over night.

Sample No. 4 was treated with an aqueous slurry containing 10.4 g. of lime, this being the total amount of lime that had been required to bring previous, like samples to pH 8.7. The sample was stirred continuously and allowed to stand over night, but the pH level increased only to 6.7. Consequently, 0.25 g. portions of lime were slurried in water and added at 15 minute intervals, agitation being maintained throughout the process. When the pH level finally reached 8.7, a total of 12.05 g. of lime had been added.

This example illustrates the saving in lime that results, in this case, amounting to about 15 per cent, when phytate hydrolyzates are neutralized in two stages, rather than one. It also illustrates the time-saving that is realized by operating according to our preferred procedure.

Example III

A 750 g. sample of phytate hydrolyzate, obtained by hydrolyzing an aqueous slurry of crude calcium phytate at 130 p. s. i. for about one hour, that assayed 24.4 g. of inositol per liter was neutralized with lime to pH 6.9, filtered and the cake was washed. The combined filtrate and washings was divided into five equal portions. Aliquot No. 1 was set aside for final dilution; its pH was 6.9. Aliquot No. 2, No. 3, No. 4 and No. 5 were carefully treated with lime to pH 8, 9, 10 and 11, respectively. They were filtered, the small resulting cakes were washed and washings were added to the filtrates. All filtrates then were diluted to like volume and aliquots were taken for ash and inositol determinations. Results were as follows:

| Sample No. | Final pH | Ash (percent of dry substance) | Inositol (g/l)[1] | (Percent recovery) |
|---|---|---|---|---|
| 1 | 6.9 | 13.33 | 23.9 | .98 |
| 2 | 8.0 | 7.39 | 24.2 | .99 |
| 3 | 9.0 | 4.78 | 24.2 | .99 |
| 4 | 10.0 | 3.86 | 23.2 | .95 |
| 5 | 11.0 | 3.55 | 23.1 | 94.7 |

[1] Calculated back to concentration in original inositol liquor.

This example illustrates that inositol-containing liquors must be neutralized to about pH 9 to about 10 for optimum ash removal with minimum inositol loss. When neutralization is carried out in two stages, as was the case in these experiments, the amount of excess lime added when the pH level was brought to 11.0 was too small to cause appreciable insolubilization of inositol as the lime-inositol complex, although some effect is shown. Samples treated with lime to a pH of about 10 to about 11 in one step have shown consistently poorer recoveries in the filtrate than are shown in this series.

For example, a batch of phytate hydrolyzate was treated with lime in one step and the pH increased to 11 following the final addition of lime. When the liquor was filtered and the cake was washed, the combined filtrate and washings contained only 78 per cent of the inositol originally present in the phytate hydrolyzate. The phosphate cake was slurried in acid to release inositol from the lime-inositol complex and the acidified mixture was filtered. The filtrate contained 22 per cent of the inositol that had been present originally in the phytate hydrolyzate, thus proving that 22 per cent of the original inositol had been insolubilized as lime-inositol complex by adding sufficient lime in the single step treatment to produce a final pH of 11. In contrast to this in the above table of results in the two-stage lime treatment process of our invention, 94.7 per cent of inositol was recovered from liquor increased to pH 11 in the final step of the lime treatment; i. e. only 5.3 per cent of the original inositol was lost.

This notably greater loss of inositol in the prior one-step lime treatment process undoubtedly is due to the greater amount of lime that must be added to bring the pH level to this range in one step, as illustrated in Example II.

*Example IV*

An aqueous solution containing 180 g. (1 mole) of inositol per liter was prepared and divided into 100 ml. aliquots. Varying amounts of lime, representing lime-inositol ratios, on a molar basis, of 0.25 to 2.0, were added. After thorough mixing, all samples were allowed to stand for three hours at room temperature and then filtered. Before drying, the cakes were washed until the total volume of filtrate and washings amounted to 200 ml. for each sample. Inositol was determined in aliquots of the filtrates, with the following results:

| Inositol in orig. soln. (g.) | Lime added | | Wt. of cake (g.) | Inositol in filtrate | |
|---|---|---|---|---|---|
| | (g.) | (moles/mole of inositol) | | (g.) | Percent of orig. |
| 18 | 1.85 | 0.25 | 7.03 | 10.3 | 57.2 |
| 18 | 3.70 | 0.50 | 15.46 | 4.6 | 25.5 |
| 18 | 5.55 | 0.75 | 19.54 | 1.7 | 9.4 |
| 18 | 7.40 | 1.00 | 21.90 | 1.3 | 7.2 |
| 18 | 14.80 | 2.00 | 29.29 | 1.2 | 6.6 |

This example shows the lime/inositol ratio that is required to produce maximum insolubilization of inositol as the lime-inositol complex, in solutions containing 180 g. of inositol per liter. Mother liquors from the crystallization of inositol usually contain from 100 to 200 g. of inositol per liter, depending somewhat on quality of the filtrate of original neutralized liquor. The results show that for maximum recovery of inositol as the lime-inositol complex, sufficient lime should be added to provide at least about one mole per mole of inositol in the mother liquor.

*Example V*

Two 100 ml. samples of mother liquor from inositol crystallization were treated with lime to recover inositol as the insoluble lime-inositol complex. The first sample of mother liquor was very dark in color and represented first greens from crystallization of inositol from concentrated, neutralized phytate hydrolyzate filtrate. The second sample was of much lighter color and represented mother liquor resulting from recrystallization of crude inositol. Both samples contained 13.3 g. of inositol and 15 g. of lime were added to each. After thorough mixing, the samples were allowed to stand for three hours and then filtered. The resulting cakes were washed, dried and weighed, and inositol was determined in the filtrates. Results were as follows:

| | Inositol present (g.) | Lime added (g.) | Wt. of cake (g.) | Inositol in filtrate | |
|---|---|---|---|---|---|
| | | | | (g.) | (percent of orig.) |
| Dark Liquor | 13.3 | 15 | 25.7 | 2.3 | 17.6 |
| Light Liquor | 13.3 | 15 | 26.7 | 1.3 | 9.7 |

This example illustrates the manner and extent to which inositol can be recovered from inositol mother liquors as the lime-inositol complex by adding an excess of lime. From 80 to 90 per cent was thus recovered, depending on quality of the mother liquor.

*Example VI*

A 500 ml. batch of inositol-containing liquor from the hydrolysis of phytate-containing material, containing 12.3 g. of inositol and having a pH of 3.7, was treated with 25 g. of lime-inositol complex that had been recovered by adding lime to a previous batch of inositol mother liquor. The 25 g. of lime-inositol complex added contained 13.5 g. of inositol and was sufficient to raise the pH of the sample of hydrolyzate to 5.0. Sufficient lime was added to raise the pH to 6.7, insolubles were separated by filtration and the pH of the filtrate then was increased to 9.5 by addition of lime. After filtering again, analysis showed that the solution contained 25.8 g. of inositol, or all of the inositol that had been present in the original converter liquor plus that added as lime-inositol complex during neutralization.

This example illustrates the manner in which inositol-containing liquors are enriched during lime treatment when lime-inositol complex recovered from inositol mother liquor is used as part of the alkaline reagent.

We claim:

1. In a process for refining crude aqueous solutions of inositol obtained by hydrolysis of phytates, the improvement comprising neutralizing the phytate hydrolyzate with at least one alkaline substance from the group consisting of calcium oxide, calcium hydroxide, and lime-inositol complex, to a pH within the range of about 6 to about 7; removing the precipitated impurities; further treating said phytate hydrolyzate with at least one of said alkaline substances to increase the pH to within the range of about 8.5 to about 10; removing the precipitated impurities; recovering crystalline inositol from said phytate hydrolyzate; treating the mother liquor from said inositol crystallization with at least one substance from the group consisting of calcium oxide, calcium hydroxide and any mixtures thereof to precipitate a lime-inositol complex; and recovering insolubilized lime-inositol complex.

2. In a process for refining crude aqueous solutions of inositol obtained by hydrolysis of phytates, the improvement comprising neutralizing the phytate hydrolyzate with at least one alkaline substance from the group consisting of calcium oxide, calcium hydroxide, and lime-inositol complex, to a pH within the range of about 6 to about 7; removing the precipitated impurities; further treating said phytate hydrolyzate with at least one of said alkaline substances to increase the pH to within the range of about 8.5 to about 10; removing the precipitated impurities; and recovering crystalline inositol from the purified phytate hydrolyzate.

3. A process for recovering inositol from its impure aqueous solutions, comprising treating an inositol-containing solution which is neutral to alkaline and substantially free of lime-precipitable ash with at least one substance from the group consisting of calcium oxide, calcium hydroxide and any mixtures thereof to precipitate a lime-inositol complex; treating said lime-inositol complex with at least one substance from the group consisting of acids and acid-forming substances which form insoluble substances with calcium; removing said insoluble substance; and recovering inositol from the solution.

4. A process for recovering inositol from its impure aqueous solutions, comprising treating an inositol-containing solution which is neutral to alkaline and substantially free of lime-precipitable ash with at least one substance from the group consisting of calcium oxide, calcium hydroxide and any mixtures thereof to precipitate a lime-inositol complex; treating said lime-inositol complex with phosphoric acid to liberate inositol and precipitate the calcium as calcium phosphate; removing the precipitate; and recovering inositol from the solution.

5. A process for recovering inositol from its impure aqueous solutions, comprising treating an inositol-containing solution which is neutral to alkaline and substantially free of lime-precipitable ash with at least one substance from the group consisting of calcium oxide, calcium hydroxide and any mixtures thereof to precipitate lime-inositol complex; treating said lime-inositol complex with carbon dioxide to liberate inositol and precipitate the calcium as calcium carbonate; removing the precipitate; and recovering inositol from the solution.

6. A process for recovering inositol from its impure aqueous solutions, comprising treating an inositol-containing solution which is neutral to alkaline and substantially free of lime-precipitable ash with at least one mole per mole of inositol present in said solution of a substance from the group consisting of lime, calcium hydroxide, and any mixtures thereof, to precipitate lime-inositol complex; treating said lime-inositol complex with an acid which will liberate inositol and form an insoluble substance with the lime; removing the insoluble material; and recovering inositol from the solution.

7. A process for recovering inositol from mother liquors obtained from the crystallization of inositol from purified phytate hydrolyzates, which comprises treating the inositol-containing mother liquor which is neutral to alkaline and substantially free of lime-precipitable ash with at least one mole per mole of inositol present, of a substance from the group consisting of calcium oxide, calcium hydroxide, and any mixtures thereof, to precipitate lime-inositol complex; separating said lime-inositol complex; treating said lime-inositol complex with an acid which forms an insoluble substance with calcium and solubilizes inositol; and recovering free inositol from said solution.

8. A process for recovering inositol from mother liquors obtained from the crystallization of inositol from purified phytate hydrolyzates, which comprises treating the inositol-containing mother liquor which is neutral to alkaline and substantially free of lime-precipitable ash with at least one mole of a substance from the group consisting of calcium oxide, calcium hydroxide, and any mixtures thereof, per mole of inositol present, to precipitate lime-inositol complex; at least partially neutralizing crude phytate hydrolyzate with said lime-inositol complex and recovering inositol therefrom.

9. A process for recovering inositol from its impure aqueous solutions, comprising treating an inositol-containing solution which is neutral to alkaline and substantially free of lime-precipitable ash with at least one mole per mole of inositol present, of a substance from the group consisting of calcium oxide, calcium hydroxide, and any mixtures thereof, to precipitate lime-inositol complex; separating said lime-inositol complex; and treating the same with acid to liberate inositol.

10. In a process for refining crude aqueous solutions of inositol, obtained by hydrolysis of phytates, the improvement comprising neutralizing the phytate hydrolyzate with an aqueous slurry of at least one alkaline substance from the group consisting of calcium oxide, calcium hydroxide and lime-inositol complex to a pH within the range of about 6 to about 7; removing the precipitated impurities; further treating said phytate hydrolyzate with said aqueous slurry of at least one of said alkaline substances, to increase the pH to within the range of about 8.5 to about 10; removing the precipitated impurities; and recovering crystalline inositol from the purified phytate hydrolyzate.

NEAL E. ARTZ.
WILLIAM HACH.

REFERENCES CITED

The following references are of record in the file of this patent:

UNITED STATES PATENTS

| Number | Name | Date |
|---|---|---|
| 2,112,553 | Bartow et al. | Mar. 29, 1938 |
| 2,414,365 | Elkin et al. | Jan. 14, 1947 |
| 2,456,470 | Thomas | Dec. 14, 1948 |

OTHER REFERENCES

Bartow et al., Industrial and Engineering Chemistry, vol. 30, No. 3, p. 300–03 (1938).